US012624827B2

(12) United States Patent
Liu

(10) Patent No.: US 12,624,827 B2
(45) Date of Patent: May 12, 2026

(54) LAMP WITH MOTORIZED LIQUID SPRAYERS

(71) Applicant: Hui-Te Chou, Dongguan City (CN)

(72) Inventor: Jianshu Liu, Dongguan City (CN)

(73) Assignee: Hui-Te Chou, Dongguan (CN)

( * ) Notice: Subject to any disclaimer, the term of this patent is extended or adjusted under 35 U.S.C. 154(b) by 0 days.

(21) Appl. No.: 19/014,115

(22) Filed: Jan. 8, 2025

(65) Prior Publication Data

US 2026/0016152 A1 Jan. 15, 2026

(30) Foreign Application Priority Data

Jul. 10, 2024 (CN) ......................... 202410919240.5

(51) Int. Cl.

*F21V 33/00* (2006.01)
*F21S 9/02* (2006.01)
*F21V 23/04* (2006.01)
*F21V 23/06* (2006.01)
*F21V 31/00* (2006.01)

(52) U.S. Cl.

CPC ............ *F21V 33/0044* (2013.01); *F21S 9/02* (2013.01); *F21V 23/04* (2013.01); *F21V 23/06* (2013.01); *F21V 31/005* (2013.01)

(58) Field of Classification Search

CPC ............. A61L 2209/12; A61L 2009/14; F21V 33/004; F21V 33/0044; F21V 31/005; F21S 9/02; F21W 2131/30

See application file for complete search history.

(56) References Cited

U.S. PATENT DOCUMENTS

| | | | | |
|---|---|---|---|---|
| 8,137,629 | B2 * | 3/2012 | Faber | A61L 9/122 239/34 |
| 8,673,223 | B1 * | 3/2014 | Finlay | A61L 9/122 239/34 |
| 9,517,286 | B1 * | 12/2016 | Li | A61L 9/145 |
| 10,161,584 | B2 * | 12/2018 | Patton | A61L 9/122 |
| 10,507,258 | B2 * | 12/2019 | Sevy | A61L 9/205 |
| 11,118,746 | B1 * | 9/2021 | Cao | A61L 9/12 |
| 11,203,033 | B2 * | 12/2021 | Freeman | A61L 9/14 |
| 12,320,109 | B2 * | 6/2025 | Johnson | F21V 33/004 |
| 2008/0038156 | A1 * | 2/2008 | Jaramillo | A61L 9/03 422/123 |
| 2008/0130266 | A1 * | 6/2008 | DeWitt | A61L 9/12 422/123 |
| 2017/0274405 | A1 * | 9/2017 | Lucas | A61L 9/14 |
| 2022/0072182 | A1 * | 3/2022 | Freeman | A61L 9/013 |
| 2022/0105224 | A1 * | 4/2022 | Vazquez Alvarez | A61L 9/013 |

* cited by examiner

*Primary Examiner* — Ismael Negron
(74) *Attorney, Agent, or Firm* — Birchwood IP

(57) ABSTRACT

A lamp includes a lamp holder defining a first cavity provided with a bracing plate and two second cavities; a spring touch switch provided on an outer wall of the lamp holder; a first motor fixed to the bracing plate; a second motor fixed to a top inner wall of the lamp holder, a charging interface provided on a side of the lamp holder, two liquid-spraying grooves symmetrically arranged on an outer wall of the lamp holder, and two sealing mechanisms provided in the lamp holder. The lamp is configured to spray an atomized liquid to a surrounding environment.

8 Claims, 8 Drawing Sheets

LAMP WITH MOTORIZED LIQUID SPRAYERS

CROSS-REFERENCE TO RELATED APPLICATIONS

This application claims priority to Chinese Patent Application No. 202410919240.5, filed on Jul. 10, 2024, which is hereby incorporated by reference in its entirety.

TECHNICAL FIELD

The present disclosure relates to the field of lamp technologies, and in particular, to a lamp with motorized liquid sprayers.

BACKGROUND

Lamp refers to an appliance that can transmit light, distribute and change a light distribution of a light source, which includes all parts required for fixing and protecting the light source except for the light source itself as well as circuital accessories necessary for connecting to the power source. Modern lamps include home lighting, commercial lighting, industrial lighting, road lighting, landscape lighting and special lighting, etc. These lamps can also be divided into wall-mounted and hand-held ones according to installation ways.

In the existing technology, there are limitations of the lamps because they do not have a function of spraying fragrance to keep the air fresh during use.

SUMMARY

The present disclosure addresses the shortcoming of the existing technology that the lamps have a function of spraying fragrance to keep the air fresh during use and provides a lamp with motorized liquid sprayers.

To achieve the above objectives, the present disclosure adopts the following technical solutions.

A lamp with motorized liquid sprayers, including:

a lamp holder;

a spring touch switch provided on an outer wall of the lamp holder, where the lamp holder is provided with a first cavity, the first cavity is fixedly provided with a bracing plate therein, a bottom of the bracing plate is fixedly provided with a first motor, and the lamp holder is further provided with two second cavities therein, a top inner wall of the lamp holder is fixedly provided with a second motor, a side of the lamp holder is provided with a charging interface, and the outer wall of the lamp holder is further provided with two liquid-spraying grooves that are symmetrically arranged;

two sealing mechanisms provided in the lamp holder, where the two sealing mechanisms are located in the two second cavities, and the two sealing mechanisms are configured to seal the two liquid-spraying grooves; and two spray mechanisms provided in the two liquid-spraying grooves, and the two spray mechanisms are configured to spray atomized aromatherapy to improve air quality.

In some embodiments of the present disclosure, a bottom inner wall of the lamp holder is provided with a circuit board, a top of the circuit board is fixedly provided with a terminal, and an upper of the lamp holder that is within the terminal is provided with a battery. The circuit board, the terminal and the battery are connected by wires.

In some embodiments of the present disclosure, the sealing mechanisms include two lifting screws, and the two lifting screws are both connected to the bracing plate; one of the two lifting screws is fixedly connected to an output shaft of the first motor; outer surfaces of the two lifting screws are fixedly connected to two synchronous wheels, and a synchronous belt is provided between the two synchronous wheels.

In some embodiments of the present disclosure, the two lifting screws are threaded connected to two lifting boards; one ends of the two lifting boards are located in the two cavities; the two lifting boards are fixedly connected to two shielding plates; the two shielding plates are slidably connected to the two cavities. Two lifting screws can drive two lifting plates to move downwards, and two lifting plates can drive the two shielding plates to move vertically downwards.

In some embodiments of the present disclosure, the spray mechanisms include a drive rod, an output shaft of the second motor is fixedly connected to the drive rod; a bottom end of the drive rod is fixedly connected to a worm; a horizontal rotating lever is provided in the lamp holder; the horizontal rotating lever is fixedly connected to a worm gear; the worm gear is meshed with the worm; two ends of the horizontal rotating lever are located in the two liquid-spraying grooves. The drive rod can drive the worm to rotate, and the worm drives a meshed worm gear to rotate. The worm gear drives the horizontal rotating rod to rotate, and the horizontal rotating rod drives two fixedly connected drive gears to rotate.

In some embodiments of the present disclosure, two ends of the horizontal rotating lever are fixedly connected to a drive gear; the two liquid-spraying grooves are both provided with a circular groove; the circular groove is slidably connected to two limit levers; one ends of the two limit levers are fixedly connected to a gear ring. The two limit rods can provide support and limit the gear ring.

In some embodiments of the present disclosure, the gear ring is meshed with the drive gear; one side of the gear ring is provided with a plurality of aromatherapy diffusers that are symmetrically arranged; the plurality of aromatherapy diffusers are all provided with an atomizing nozzle. The atomizing nozzle can liquefy and spray aromatherapy, thereby improving the air quality.

In some embodiments of the present disclosure, a bottom of the lamp holder is fixedly provided with a magnet, and the bottom of the lamp holder is further provided with a connection seat; the connection seat is provided with a light bulb thereon. The magnet can absorb and fix the lamp holder, thereby improving its stability. The connection seat, the lamp bulb, and the lamp holder are threaded connected.

Compared with the existing technology, the present disclosure has obvious advantages as follows.

In the present application, by providing a spring touch switch, the lamp bulb is light up by touching the spring touch switch, it has a touch function and can bring convenience, aesthetic appeal and an advanced sense for consumers. The providing of a charging interface, which has a wireless function that can break a limitation of the traditional table lamp that requires a connection of a wire to a socket, and it can be moved at will, which is suitable for an arrangement of a dynamic occasions.

In the present application, by providing two gear rings, a plurality of aromatherapy diffusers are driven to rotate, and the plurality of aromatherapy diffusers drive a plurality of atomizing nozzles to rotate. Thus, aromatherapy is uniformly sprayed by aromatherapy diffusers through the atomizing nozzles to improve air quality.

In the present application, by providing two lifting screws, two lifting boards are driven to move upward, and the two lifting boards drive two shielding plates to move vertically upward and shield the two liquid-spraying grooves, thereby avoiding dust into the liquid-spraying grooves which is difficult to clean.

The structure of the present disclosure is simple. By utilizing the spray mechanisms to uniformly spray atomized aromatherapy, thereby improving the air quality. And this device has a touch function and offers convenience, aesthetic appeal and an advanced sense for consumers. At the same time, this product has a wireless function that breaks the limitation of traditional table lamps which require a connection of a wire to a socket. It can be moved at will and is suitable for dynamic occasions such as party dinners, meetings and weddings, thereby providing both decorative and illuminating functions on the table, unrestricted by a power source supplied through the socket. The magnetic combination of a sleeve tube of this product can be strongly adsorbed to the lamp body and facilitate people to use.

NUMERAL REFERENCE

1 lamp holder; 2 spring touch switch; 3 first cavity; 4 first motor; 5 second moor; 6 charging interface; 7 circuit board; 8 terminal; 9 battery; 10 lifting screw; 11 synchronous wheel; 12 synchronous belt; 13 lifting board; 14 shielding plate; 15 drive rod; 16 worm; 17 horizontal rotating lever; 18 drive gear; 19 circular groove; 20 limit lever; 21 gear ring; 22 aromatherapy diffuser; 23 magnet; 24 bracing plate; 25 atomizing nozzle; 26 worm gear; 27 connection seat; 28 light bulb.

DESCRIPTION OF EMBODIMENTS

The following provides a detailed and comprehensive description of the technical scheme of embodiments of the present disclosure, in combination with the accompanying drawings. It should be noted that the described embodiment represents only a part of the embodiments, rather than the entirety of the embodiments.

Embodiment 1

Figure 1:
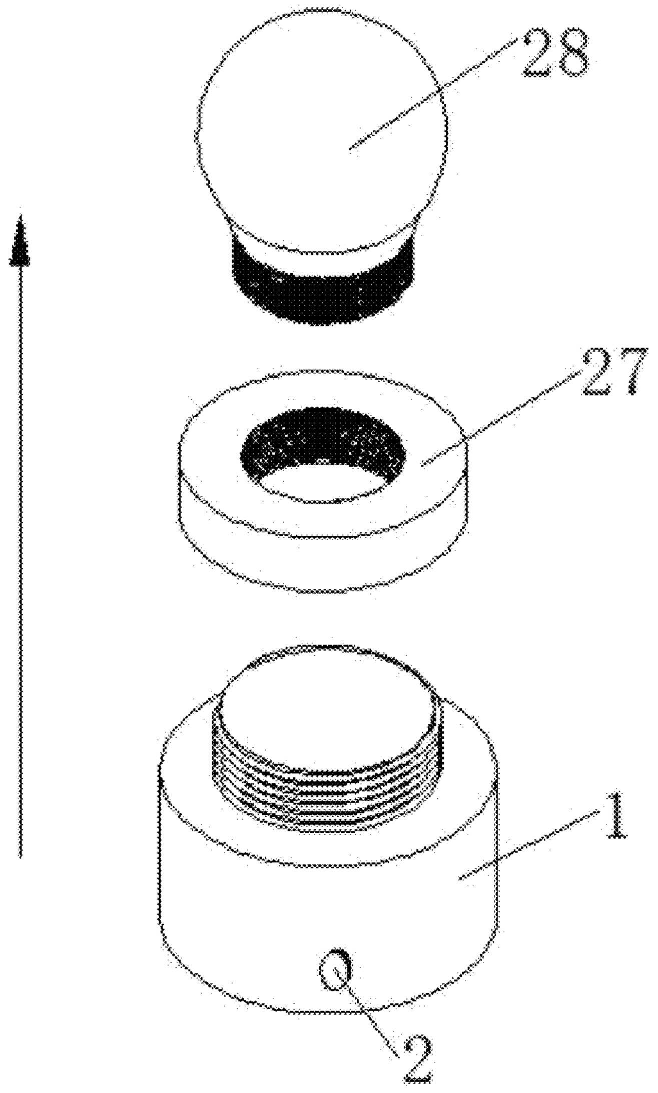
FIG. 1 is a schematic diagram of an explosive three-dimensional structure of a lamp with motorized liquid sprayers provided by the present disclosure.
Figure 2:
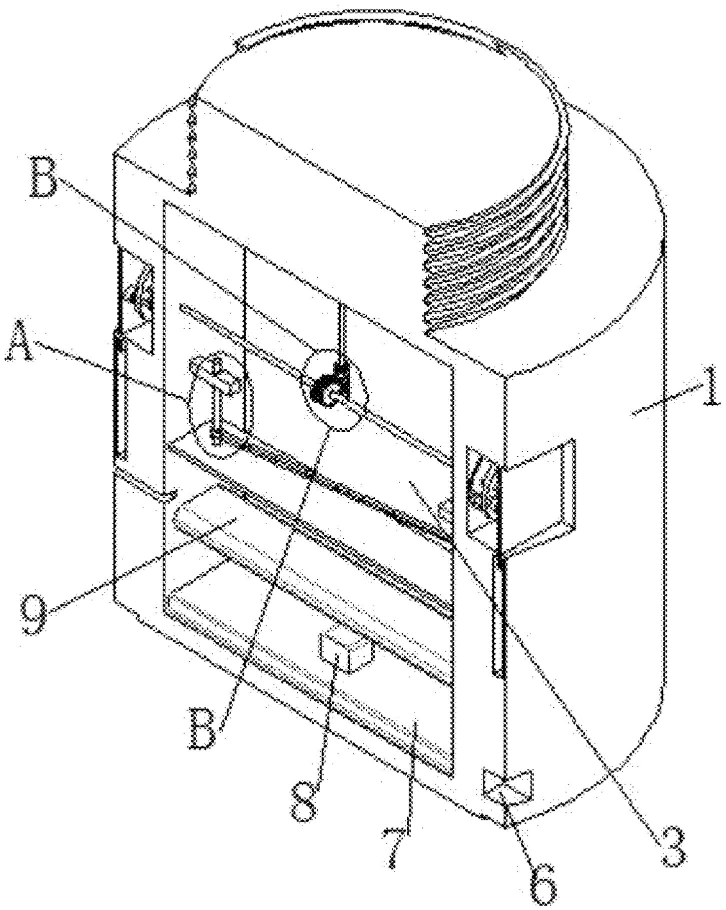
FIG. 2 is a three-dimensional structure diagram of a lamp holder of the lamp with motorized liquid sprayers provided by the present disclosure.
Figure 3:
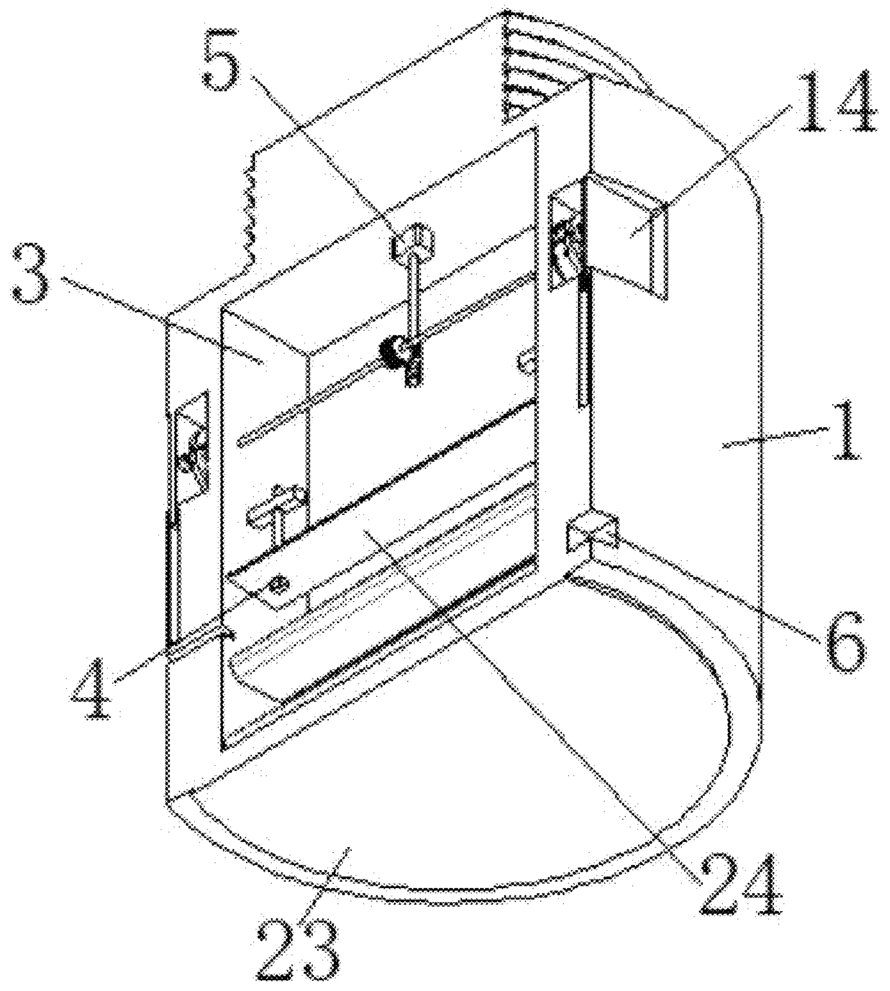
FIG. 3 is an oblique view of a three-dimensional structure diagram of the lamp holder of the lamp with motorized liquid sprayers provided by the present disclosure.
Figure 4:
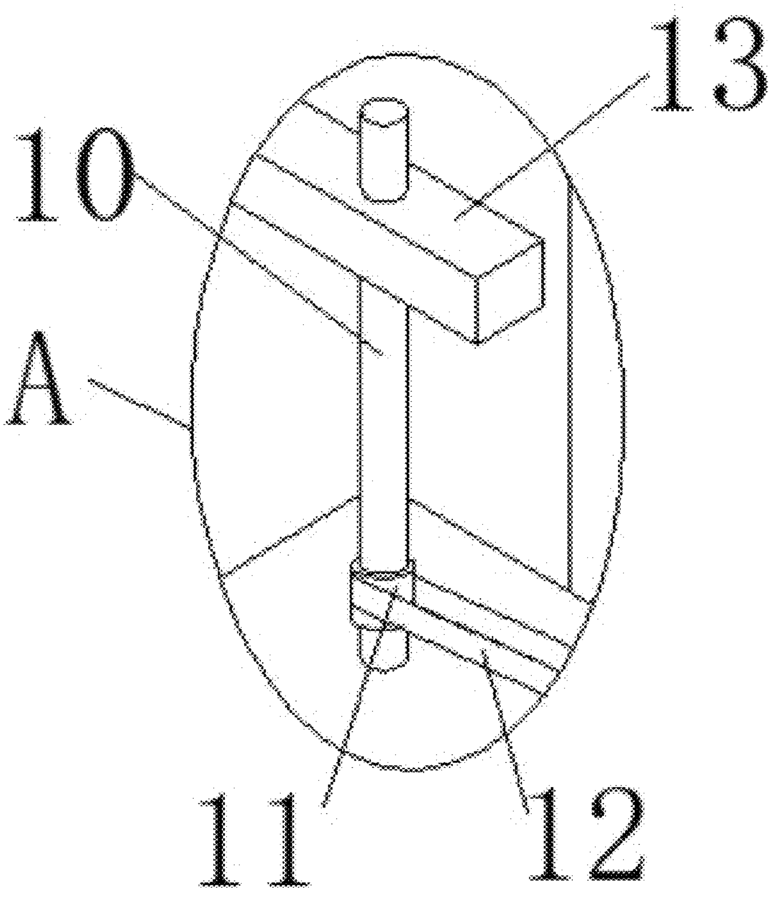
FIG. 4 is a structure diagram of part A of the lamp with motorized liquid sprayers in FIG. 2 provided by the present disclosure.
Figure 5:
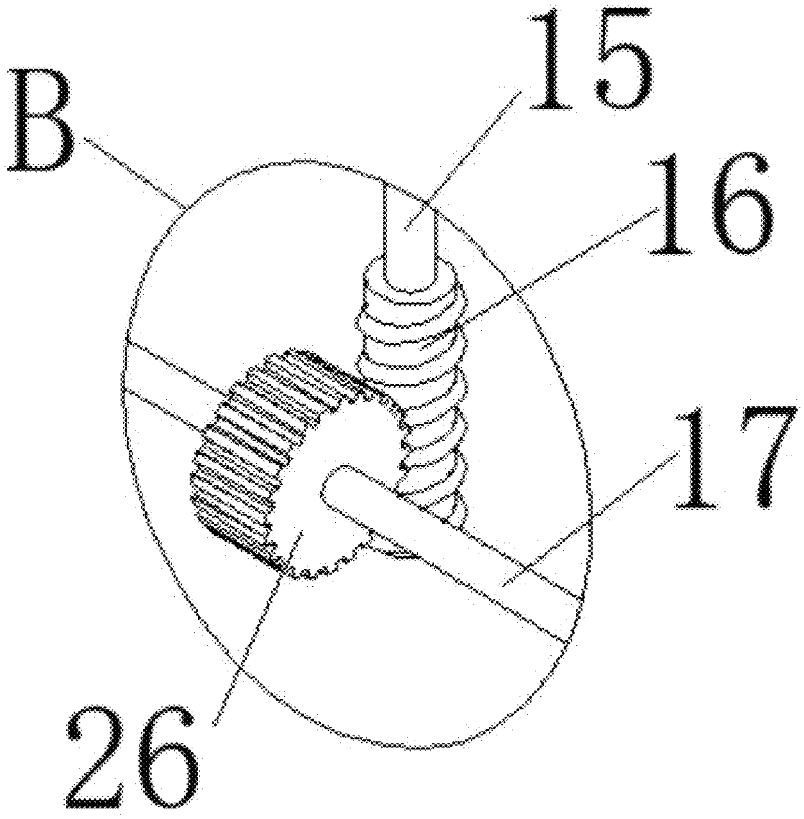
FIG. 5 is a structure diagram of part B of the lamp with motorized liquid sprayers in FIG. 2 provided by the present disclosure.
Figure 6:
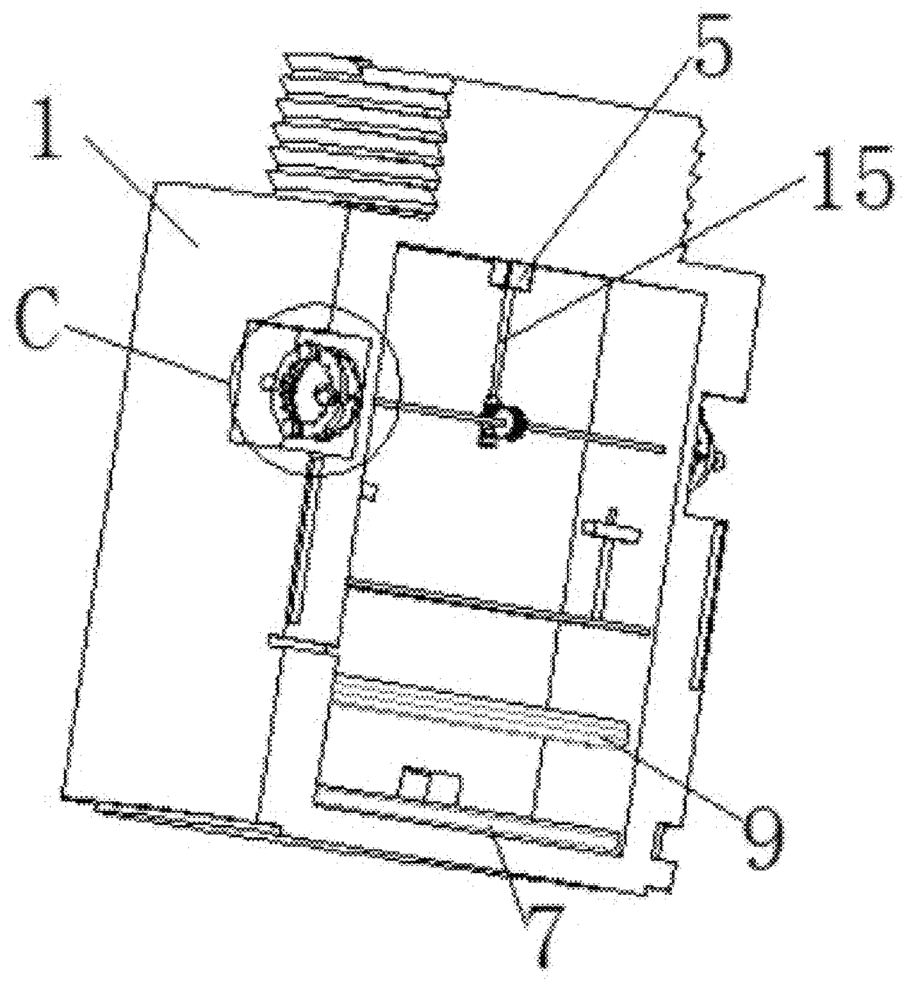
FIG. 6 is a schematic diagram of a sectional three-dimensional structure of the lamp with motorized liquid sprayers provided by the present disclosure.
Figure 7:
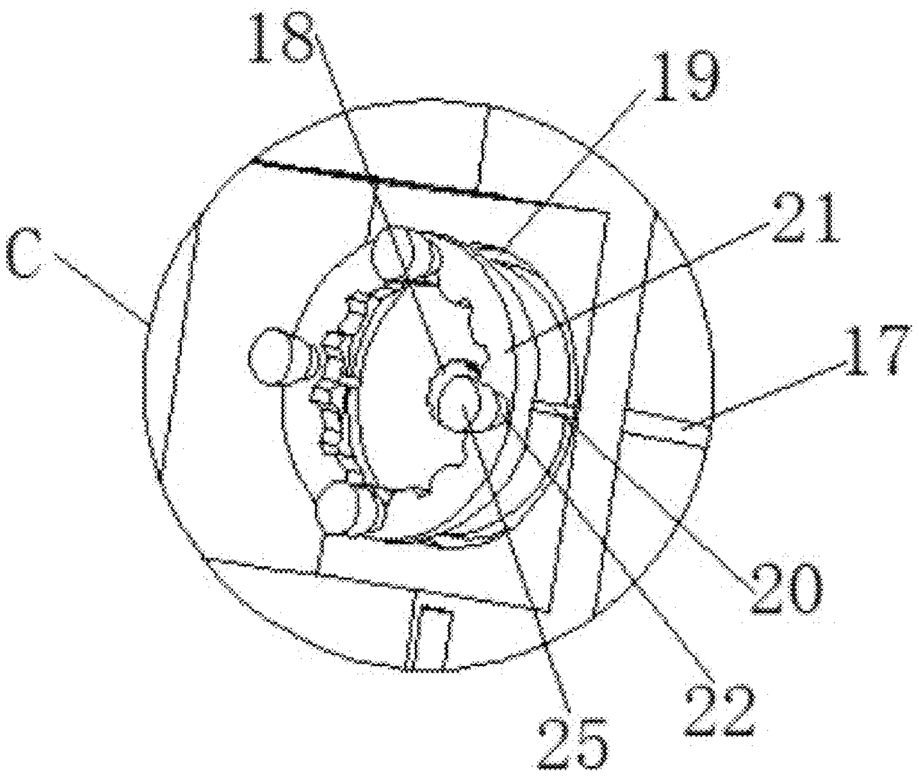
FIG. 7 is a structure diagram of part C of the lamp with motorized liquid sprayers in FIG. 6 provided by the present disclosure.
Figure 8:
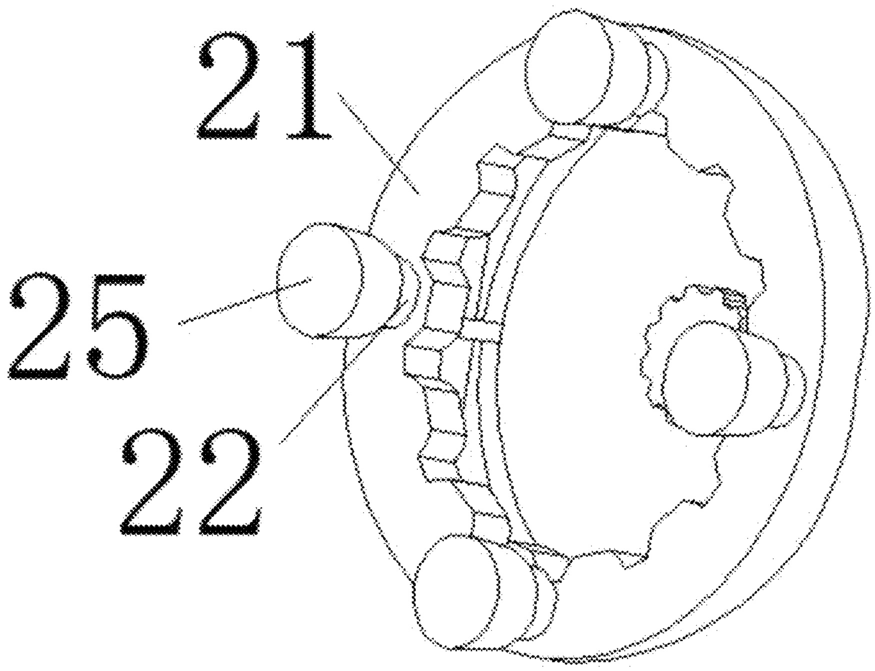
FIG. 8 is a three-dimensional structure diagram of a gear ring of the lamp with motorized liquid sprayers provided by the present disclosure.

As shown in FIGS. 1-8, a lamp with motorized liquid sprayers, including:

- a lamp holder 1,
- a spring touch switch 2 provided on an outer wall of the lamp holder 1, the lamp holder 1 is provided with a first cavity 3, the first cavity 3 is fixedly provided with a bracing plate 24, a bottom of the bracing plate 24 is fixedly provided with a first motor 4, the lamp holder 1 is further provided with two second cavities, and a top inner surface of the lamp holder 1 is fixedly provided with a second motor 5, a side of the lamp holder 1 is provided with a charging interface 6, the outer wall of the lamp holder 1 is further provided with two liquid-spraying grooves that are symmetrically arranged;
- two sealing mechanisms provided in the lamp holder 1, and the two sealing mechanisms are respectively located in the two second cavities and are configured to seal the two liquid-spraying grooves; and
- two spray mechanisms provided in the two liquid-spraying grooves, and the two spray mechanisms are configured to spray atomized aromatherapy to improve air quality.

In this embodiment, a bottom inner surface of the lamp holder 1 is provided with a circuit board 7; a top of the circuit board 7 is fixedly provided with a terminal 8; an upper of the lamp holder 1 that is within the terminal 8 is provided with a battery 9. The circuit board 7, the terminal 8 and the battery 9 are connected through a wire.

In this embodiment, the sealing mechanisms include two lifting screws 10, and the two lifting screws 10 are rotatably connected to the bracing plate 24. One of the two lifting screws 10 is fixedly connected to an output shaft of the first motor 4. Outer walls of the two lifting screws 10 are fixedly connected to two synchronous wheels 11, and a synchronous belt 12 is provided between the two synchronous wheels 11.

In an implementation mode, the two lifting screws 10 are connected to two lifting boards 13 through threads. One ends of two lifting boards 13 are located in the two cavities. The two lifting boards 13 are both fixedly connected to two shielding plates 14, and the two shielding plates 14 are respectively and slidably connected to the two cavities. The two lifting screws 10 can drive the two lifting boards 13 to move downward, and the two lifting boards 13 drive the two shielding plates 14 to move vertically downward.

In this embodiment, the spray mechanisms include a drive rod 15; an output shaft of the second motor 5 is fixedly connected to the drive rod 15. A bottom end of the drive rod 15 is fixedly connected to a worm 16; a horizontal rotating lever 17 is rotatably provided in the lamp holder 1. The horizontal rotating lever 17 is fixedly connected to a worm gear 26, and the worm gear 26 is meshes with the worm 16. Two ends of the horizontal rotating lever 17 are respectively located in the two liquid-spraying grooves; the drive rod 15 can drive the worm 16 to rotate, and the worm 16 drives a meshed worm gear 26 to rotate. The worm gear 26 drives the horizontal rotating lever 17 to rotate, and the horizontal rotating lever 17 drives two fixedly connected drive gear 18 to rotate.

In this embodiment, two ends of the horizontal rotating lever 17 are fixedly connected to a drive gear 18, and the two liquid-spraying grooves are both provided with a circular groove 19. The circular groove 19 is connected to two limit levers 20 in a sliding manner; one ends of the two limit levers 20 are fixedly connected to a gear ring 21, and the two limit levers 20 can support and limit the gear ring 21.

In this embodiment, the gear ring 21 is meshed with the drive gear 18, one side of the gear ring 21 is provided with a plurality of aromatherapy diffusers 22 that are symmetrically arranged. The aromatherapy diffusers 22 are all provided with an atomizing nozzle 25. The atomizing nozzle 25 can spray atomized aromatherapy, thereby improving the air quality.

In this embodiment, a bottom of the lamp holder 1 is provided with a magnet 23, the bottom of the lamp holder 1 is further provided with a connection seat 27; the connection seat 27 is provided with a light bulb 28 thereon. The magnet 23 can be adsorbed and fixed to the lamp holder 1 to improve its stability. The connection seat 27, the light bulb 28 and the lamp holder 1 are connected through threads.

Embodiment 2

As shown in FIGS. 1-8, a lamp with motorized liquid sprayers, including:

- a lamp holder 1,
- a spring touch switch 2 provided on an outer wall of the lamp holder 1, the lamp holder 1 is provided with a first cavity 3, the first cavity 3 is fixedly provided with a bracing plate 24 therein, a bottom of the bracing plate 24 is fixedly provided with a first motor 4, the lamp holder 1 is further provided with two second cavities, and a top inner wall of the lamp holder 1 is fixedly provided with a second motor 5, a side of the lamp holder 1 is provided with a charging interface 6, the outer wall of the lamp holder 1 is further provided with two liquid-spraying grooves that are symmetrically arranged;
- two sealing mechanisms provided in the lamp holder 1, the two sealing mechanisms are respectively located in the two second cavities, and the two sealing mechanisms are configured to seal the two liquid-spraying grooves; and
- two spray mechanisms provided in the two liquid-spraying grooves, and the two spray mechanisms are configured to spray atomized aromatherapy to improve air quality.

In this embodiment, a bottom inner wall of the lamp holder 1 is fixedly provided with a circuit board 7. A top of the circuit board 7 is provided with a terminal 8, and an upper of the lamp holder 1 that is within the terminal 8 is provided with a battery 9. The circuit board 7, the terminal 8 and the battery 9 are connected through a wire.

In this embodiment, the sealing mechanisms include two lifting screws 10, and the two lifting screws 10 are rotatably connected to the bracing plate 24. One of the two lifting screws 10 is fixedly connected to an output shaft of the first motor 4. Outer walls of the two lifting screws 10 are fixedly connected to two synchronous wheels 11, and a synchronous belt 12 is provided between the two synchronous wheels 11. The two lifting screws 10 are both threaded connected to two lifting boards 13. One ends of the two lifting boards 13 are located in the two cavities. The two lifting boards 13 are fixedly connected to two shielding plates 14, and two shielding plates 14 are respectively and slidably connected to the two cavities. The two lifting screws 10 can drive the two lifting boards 13 to move downward, and the two lifting boards 13 drive the two shielding plate 14 to move vertically downward.

In this embodiment, the spray mechanisms include a drive rod 15; an output shaft of the second motor 5 is fixedly connected to the drive rod 15. A bottom end of the drive rod 15 is fixedly connected to a worm 16, a horizontal rotating lever 17 is rotatably provided in the lamp holder 1. The horizontal rotating lever 17 is fixedly connected to a worm gear 26, and the worm gear 26 is meshed with the worm 16. Two ends of the horizontal rotating lever 17 are respectively located in the two liquid-spraying grooves; the drive rod 15 can drive the worm 16 to rotate, and the worm 16 drives a meshed worm gear 26 to rotate. The worm gear 26 drives the horizontal rotating lever 17 to rotate, and the horizontal rotating lever 17 drives two fixedly connected drive gear 18 to rotate. Two ends of the horizontal rotating lever 17 are fixedly connected to the drive gear 18, and the two liquid-spraying grooves are both provided with a circular groove 19. The circular groove 19 is slidably connected to two limit levers 20, and one ends of the two limit levers 20 are both fixedly connected to a gear ring 21; the two limit levers 20 can support and limit the gear ring 21. The gear ring 21 is meshed with the drive gear 18; a side of the gear ring 21 is provided with a plurality of aromatherapy diffusers 22 that are symmetrically arranged. The plurality of aromatherapy diffusers 22 are all provided with an atomizing nozzle 25; the atomizing nozzle 25 can liquefy and spray aromatherapy, thereby improving the air quality.

In this embodiment, a bottom of the lamp holder 1 is provided with a magnet 23; and the bottom of the lamp holder 1 is further provided with a connection seat 27. The connection seat 27 is provided with a light bulb 28. The magnet 23 can be adsorbed and fixed on the lamp holder 1 to improve its stability. The connection seat 27, the light bulb 28 and the lamp holder 1 are connected through threads.

The implementation principle of the lamp with motorized liquid sprayers in the embodiments is as follows: a user manually touches the spring touch switch 2 to control the light bulb 28 to light up. This device has a function of touch and offers consumers convenience, aesthetic appeal and advanced use experience. Besides that, this product has a wireless function that breaks the limitation of traditional table lamps which require a connection of a wire to a socket. It could be moved at will and is suitable for dynamic occasions such as party dinners, meetings and weddings, thereby providing both decorative and illuminating functions on the table, unrestricted by a power source supplied through the socket. The magnetic matched with a sleeve tube of this product can be strongly adsorbed to the lamp body and cannot be easily separated due to movement. When it is necessary to atomize the aromatherapy to the air, the motor 4 is first started. The output shaft of the first motor 4 drives the lifting screws 10 to rotate. Due to the synchronous belt 12 provided between the two synchronous wheels 11, the two lifting screws 10 are rotated synchronously. The two lifting screws 10 drive the two lifting boards 13 to move downward. The two lifting boards 13 drive the two shielding plates 14 to move vertically downward and away from the two liquid-spraying grooves. The second motor 5 is started, the output shaft of the second motor 5 drives the drive rod 15 to rotate, and the drive rod 15 drives the worm 16 to rotate. The worm 16 drives the meshed worm gear 26 to rotate, and the worm gear 26 drives the horizontal rotating lever 17 to rotate. The horizontal rotating lever 17 drives two fixedly connected drive gear 18 to rotate, and the two drive gears 18 drive two meshed gear rings 21 to rotate. The two gear rings 21 drive the two limit levers 20 to slide within the two circular grooves 19. At the same time, the two gear rings 21 drive the plurality of aromatherapy diffusers 22 to rotate. The plurality of aromatherapy diffusers 22 drive the plurality of atomizing nozzles 25 to rotate, and the plurality of aromatherapy diffusers 22 atomize aromatherapy through the plurality of atomizing nozzles 25 to improve the air quality. When air is needed to atomize aromatherapy, the first motor 4 is reverse started, and the output shaft of the first motor 4 drives the lifting screws 10 to rotate. Due to the synchronous belt 12 provided between the two synchronous wheels 11, the two lifting screws 10 are rotated synchronously. The two lifting screws 10 drive the two lifting boards 13 to move upward. The two lifting boards 13 drive the two shielding plates 14 to move vertically upward and shield the two liquid-spraying grooves to avoid dust into the two liquid-spraying grooves which is difficult to clean.

Embodiment 3

A difference between this embodiment and Embodiment 1 is that: the outer wall of the lamp holder 1 is provided with an irregular circular groove, the irregular circular groove is provided with colored light strips for creating the atmosphere. All structures in the present application can be selected according to actual uses for material and length. The attached drawings are schematic structural drawings and actual dimensions can be adjusted appropriately.

The above description is only preferred specific implementation modes of the embodiments, but the protection scope of the embodiments is not limited to this. Those skilled in the art should be included in the protection scope of the embodiments within the technical scope disclosed in the embodiment, and any equivalent replacement or change based on the technical solution and the inventive concept of the embodiments should be included in the protection scope of the embodiments.

What is claimed is:

1. A lamp comprising:

a lamp holder defining a first cavity with a bracing plate, and two second cavities;

a spring touch switch provided on an outer wall of the lamp holder;

a first motor fixedly provided on a bottom of the bracing plate;

a second motor fixedly provided on a top inner wall of the lamp holder;

a charging interface provided on a side of the lamp holder;

two liquid-spraying grooves symmetrically arranged in the outer wall of the lamp holder;

two sealing mechanisms provided in the two second cavities, and configured to seal the two liquid-spraying grooves; and two spray mechanisms provided in the two liquid-spraying grooves, and configured to spray an atomized liquid into the surrounding environment.

2. The lamp according to claim 1, further comprising a circuit board provided on a bottom inner wall of the lamp holder, a terminal provided in a top of the circuit board, and a battery coupled to the terminal.

3. The lamp according to claim 1, further comprising a magnet fixedly provided at a bottom of the lamp holder; a connection seat further provided in the lamp holder and a light bulb provided in the connection seat.

4. The lamp according to claim 1, further comprising two lifting screws provided in the sealing mechanisms, and connected to the bracing plate; two synchronous wheels connected to the outer surfaces of the lifting screws; and a synchronous belt provided between the two synchronous wheels, wherein one of the two lifting screws is fixedly connected to an output shaft of the first motor.

5. The lamp according to claim 4, further comprising two lifting boards threadedly connected to the lifting screws, with first ends of the two lifting boards are located in the two cavities; and two shielding plates fixedly connected to the lifting boards, and slidably connected to the two second cavities.

6. The lamp according to claim 1, further comprising a drive rod fixedly connected to an output shaft of the second motor; a worm fixedly connected to a bottom end of the drive rod; a horizontal rotating lever provided in the lamp holder; a worm gear fixedly connected to the horizontal rotating lever and meshed with the worm, wherein two ends of the horizontal rotating lever are located in the two liquid-spraying grooves.

7. The lamp according to claim 6, further comprising a drive gear fixedly connected to two ends of the horizontal rotating lever; a circular groove provided in the two liquid spraying grooves;

two limit levers slidably connected to the circular grooves;

and a gear ring fixedly connected to first ends of the two limit levers.

8. The lamp according to claim 7, further comprising a plurality of fluid diffusers symmetrically arranged on a first side of the gear ring, each provided with an atomizing nozzle, wherein the gear ring is meshed with the drive gear.

* * * * *